United States Patent [19]
Veal

[11] Patent Number: 5,952,022
[45] Date of Patent: Sep. 14, 1999

[54] HIGHLY FLAVORED CHEESE PRODUCT AND METHOD FOR PRODUCING

[75] Inventor: Rufus Michael Veal, Lakeland, Tenn.

[73] Assignee: Kraft Foods, Inc., Northfield, Ill.

[21] Appl. No.: 09/066,151

[22] Filed: Apr. 24, 1998

[51] Int. Cl.⁶ .......................... A23C 9/12; A23C 19/028
[52] U.S. Cl. .................... 426/36; 426/38; 426/34; 426/35; 426/42; 426/43; 426/582
[58] Field of Search .................. 426/34, 35, 36, 426/38, 40, 42, 43, 63, 582, 580

[56] References Cited

U.S. PATENT DOCUMENTS

| | | | |
|---|---|---|---|
| 2,531,329 | 11/1950 | Farnham | 195/63 |
| 2,793,122 | 5/1957 | Erekson | 99/116 |
| 3,295,991 | 1/1967 | Cort et al. | 99/116 |
| 3,348,952 | 10/1967 | Hori et al. | 99/116 |
| 3,375,118 | 3/1968 | Cox | 99/116 |
| 3,446,627 | 5/1969 | Noznick et al. | 99/115 |
| 3,650,768 | 3/1972 | Roberts | 99/116 |
| 3,667,968 | 6/1972 | Kasik et al. | 99/140 |
| 3,895,123 | 7/1975 | Moinas et al. | 426/534 |
| 3,975,544 | 8/1976 | Kosikowski | 426/35 |
| 4,119,732 | 10/1978 | Kratochvil | 426/36 |
| 4,172,900 | 10/1979 | Dooley | 426/38 |
| 4,244,971 | 1/1981 | Wargel et al. | 426/35 |
| 4,379,170 | 4/1983 | Hettinga et al. | 426/40 |
| 4,497,834 | 2/1985 | Barta | 426/42 |
| 4,595,594 | 6/1986 | Lee et al. | 426/35 |
| 4,675,193 | 6/1987 | Boudreaux | 426/35 |
| 4,752,483 | 6/1988 | Hagberg et al. | 426/35 |
| 5,211,972 | 5/1993 | Kratky et al. | 426/35 |
| 5,360,617 | 11/1994 | Gasson | 426/36 |
| 5,429,829 | 7/1995 | Ernster, Sr. | 426/36 |

*Primary Examiner*—Keith Hendricks
*Attorney, Agent, or Firm*—Fitch, Even, Tabin & Flannery

[57] ABSTRACT

The present invention is directed to a process for producing a highly flavored cheese product in a short period of time. In the method, a mixture of cream, whole milk and non-fat dry milk is provided. The mixture has a solids content of from about 45% to about 55%. The mixture is pasteurized or heat treated and the temperature of the mixture is adjusted to between about 85° F. and about 95° F. A lactic acid producing culture, at least one enzyme and rennet is added to the mixture. The mixture is then fermented at a temperature of from about 85° F. to about 95° F. for a period of time sufficient to provide a highly flavored cheese coagulum. The cheese coagulum is then heated to a temperature of from about 160° F. to about 175° F. to inactivate the culture and enzymes and to provide a highly flavored cheese product. The cheese product is cut with agitation. Thereafter, the cheese product is cooled to a temperature of from about 40° F. to about 50° F. The highly flavored cheese product has a very fine curd and can be utilized immediately in the manufacture of process cheese.

9 Claims, 1 Drawing Sheet

HIGHLY FLAVORED CHEESE PRODUCT AND METHOD FOR PRODUCING

FIELD OF THE INVENTION

The present invention relates generally to a method for producing a highly flavored cheese product in a short period of time. More particularly, the present invention is directed to producing a highly flavored cheese product which can be utilized in the manufacture of process cheese or which can be spray dried to produce dehydrated cheese blends.

BACKGROUND OF THE INVENTION

Natural cheese is generally made by developing acidity in milk and setting the milk with a clotting agent, such as rennet, or by developing acidity to the isoelectric point of the protein. The set milk is cut and whey is separated from the resulting curd. The curd may be pressed to provide a cheese block. Curing typically takes place over a lengthy period of time under controlled conditions. Cheddar cheese, for example, is cured for a period of at least four months and may be cured for a period in excess of one year to obtain the full flavor desired in cheddar cheese.

It is well known to provide a product having some of the characteristics of natural cheese by grinding a natural cheese, and heating it with an emulsifying salt. The name given to the resulting product depends upon the ingredients used and its composition and, in some instances, is determined by regulations promulgated by the U.S. Food and Drug Administration 21 C.F.R. §133.169–180. For example, the term "pasteurized process cheese" refers to a product comprising a blend of cheeses to which an emulsifying agent, usually an emulsifying salt, and possibly acids, have been added, and which has then been worked and heated into a homogeneous plastic mass. The flavor of process cheese is dependent on utilizing a high proportion of long hold (aged over four months) natural cheese. The use of long hold cheese increases the cost of process cheese due to storage and inventory costs. The yield of natural cheese produced by conventional methods is relatively low, about 10–12 pounds of cheese are produced per 100 pounds of milk. This also increases costs.

The term "pasteurized process cheese food" refers to a product which is prepared from the same materials and the same processes used for manufacture of process cheese. However, cheese food generally has dairy ingredients added thereto, such as cream, milk, skimmed milk, whey, or any of these from which part of the water has been removed (e.g., concentrated skimmed milk). The moisture level in process cheese food is generally higher than that of process cheese and may be up to about 44%. Fat is generally present at a level of not less than 23%.

The term "pasteurized process cheese spread" refers to a product which is similar to cheese food, in the sense that it can contain the indicated dairy ingredients. Process cheese spread, however, may have a moisture level as high as 60%, and a minimum fat level of 20%.

Process cheese, process cheese food and process cheese spread are referred to as "standardized products", since their methods of manufacture and composition are determined by Federal Standards of Identity.

As used herein, the term "process cheese-type products" includes those products known and referred to as "pasteurized process cheese", "pasteurized process cheese food", "pasteurized process cheese spread", and "pasteurized process cheese product". "Process cheese type-products" also includes products resembling process cheese, process cheese food, process cheese spread and process cheese product, but which may not meet the U.S. Federal Standards of Identity for any of the above products in that they may contain ingredients not specified by such Standards, such as vegetable oil or vegetable protein, or may not meet the compositional requirements of such Standards. Process cheese-type products also include products having flavor and texture similar to those of a process cheese-type product regardless of the ingredients or manufacturing steps employed, and regardless of whether the Standards have been met.

There have been many efforts to produce a highly flavored cheese ingredient, which can be used in process cheese, in a shortened period of time. U.S. Pat. No. 4,752,483 to Hagburg, et al. is directed to a method for producing a highly flavored cheese ingredient. In the process of the Hagburg, et al. patent, cheese curd is first produced. In the method of the Hagburg, et al. patent, "green" cheddar-type cheese curds are combined with a protease, a lipase and water and the mixture is incubated for a period of time. As used in the Hagburg, et al. patent, the term "green" cheddar-type cheese curd refers to a cheddar cheese which has been aged less than about 60 days. The cheese curd is ground before it is mixed with the lipase, protease and water. The mixture is then incubated for a period of about 5½ days.

U.S. Pat. No. 4,172,900 to Dooley is directed to producing a natural cheese product having a highly intensified American cheese flavor which is adapted for use in the preparation of process cheese. In the method, cheese curd is produced in the usual way, wherein a coagulum is produced from milk, the coagulum is cut to produce curds and whey and the whey is drained to provide cheese curds. The curd particles are produced, mixed with salt, a source of lipolytic enzyme and a source of a proteolytic enzyme and cured for a period of time sufficient to produce increased levels of $C_2$–$C_{10}$ fatty acids, as compared to conventional American-type cheese.

U.S. Pat. No. 4,119,732 to Kratochvil is directed to a method for rapidly producing cheese. In the method, rennet, kid lipase and calf lipase are mixed with milk during the fermenting period. The milk is then coagulated and cut into curd particles followed by processing by the normal procedure for producing cheddar cheese, which includes a whey draining step. The curd is formed into a cheese block and the cheese block is aged for about 10 weeks to provide an intense aged cheddar cheese flavor.

U.S. Pat. No. 3,975,544 to Kosikowski describes a method for producing cheddar cheese from pasteurized milk wherein an enzyme mixture is added to cheddared curds to substantially reduce the curing time of the cheese block. The cheese blocks are cured for a period of one month at 10°–25° C.

It would be desirable to provide a method for producing a highly flavored cheese product which does not involve a whey drainage step and which can be accomplished in a short period of time.

It is another object of the invention to produce a highly flavored cheese product by a method which results in an increased yield in excess of 95%.

Accordingly, the present invention is directed to a process for producing a highly flavored cheese product in a short period of time with minimal whey removal.

SUMMARY OF THE INVENTION

Figure 1:
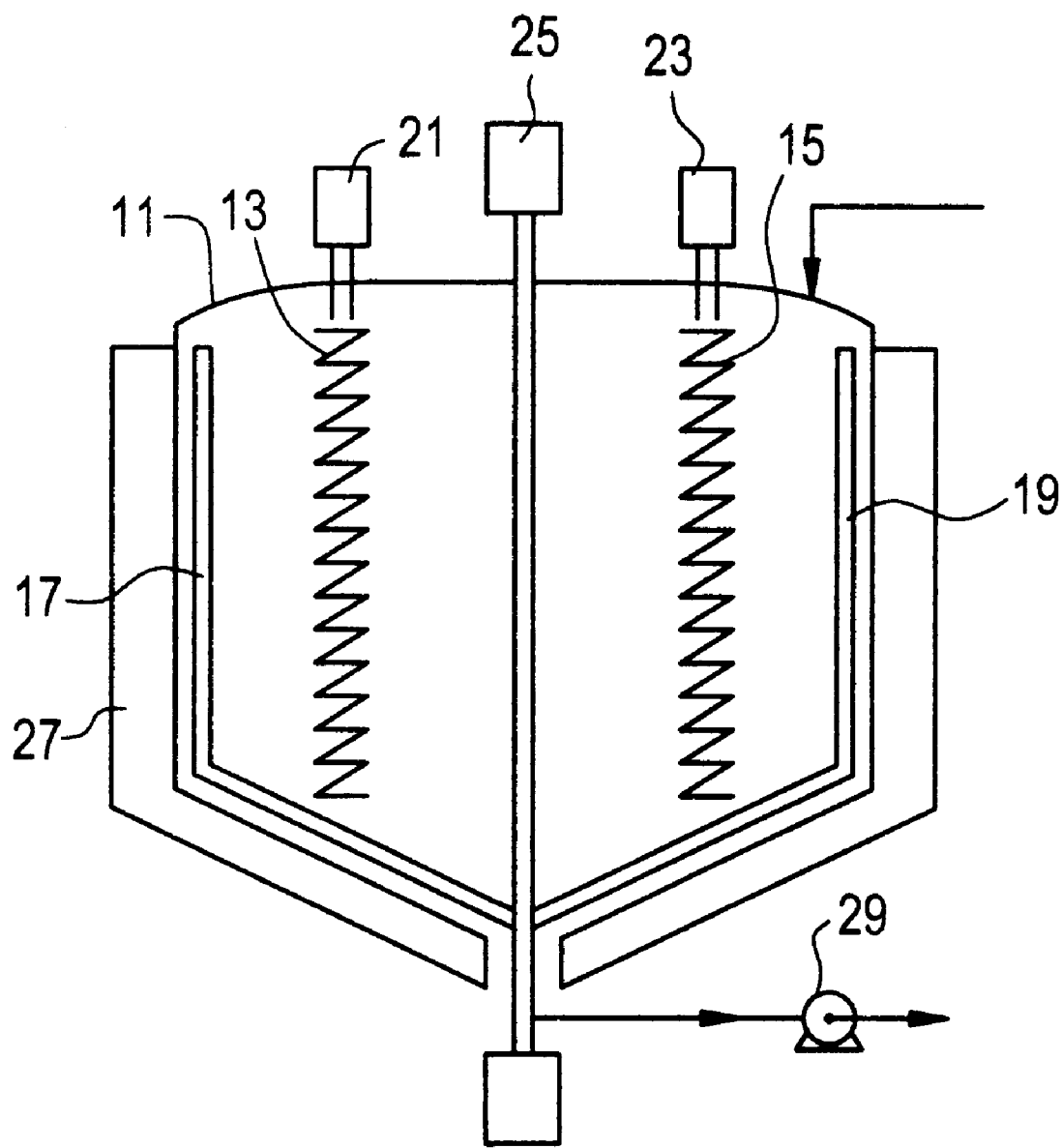
FIG. 1 is a schematic cross sectional view of a fermentation tank and mixing system utilized in the method of the present invention.

The present invention is directed to a process for producing a highly flavored cheese product in a short period of time with a yield in excess of 95%. In the method, a mixture of cream, whole milk and non-fat dry milk is provided. The mixture has a solids content of from about 45% to about 55%. The mixture is pasteurized or heat treated and the temperature of the mixture is adjusted to between about 85° F. and about 95° F. A lactic acid producing culture, at least one enzyme and rennet is added to the mixture. The mixture is then fermented at a temperature of from about 85° F. to about 95° F. for a period of time sufficient to provide a highly flavored cheese coagulum. The cheese coagulum is then heated to a temperature of from about 160° F. to about 175° F. to inactivate the culture and enzymes and to provide a highly flavored cheese product. The cheese product is cut with agitation. Thereafter, the cheese product is cooled to a temperature of from about 40° F. to about 50° F. The highly flavored cheese product has a very fine curd and can be utilized immediately in the manufacture of process cheese.

The highly flavored cheese product is useful in the preparation of process cheese or can be spray dried to produce a highly flavored cheese powder.

DETAILED DESCRIPTION OF THE INVENTION

In the method of the invention, whole milk, cream and non-fat dry milk are mixed together to provide a cheese substrate having from about 45% to about 55% solids. The whole milk may be provided by use of pasteurized whole milk or may be provided by reconstituting powdered whole milk. The whole milk component will have a solids content of from about 3 to about 6%. The cream has a fat content of from about 60% to about 85%. The non-fat dry milk has a solids content of about 98%. All percentages used herein are by weight, unless otherwise indicated.

The whole milk is used at a level of from about 30% to about 50%. The cream is used at a level of from about 25% to about 35% and the non-fat dry milk is used at a level of from about 20% to about 30%. The fat level of the cheese substrate is from about 20% to about 30%. Salt is present at a level of from about 0.5 to about 1.0%. A lactic acid cheese culture is present at a level of from about 0.5% to about 1.0% and a powdered enzyme is present at a level of from about 0.1% to about 1.0%.

The whole milk or water and whole milk powder is first added to a fermentation tank. The whole milk is heated to a temperature of from about 170° to about 180° F. with agitation over a period of from about 3 to about 4 hours. The cream is then added to the tank. Non-fat dry milk is then added. The addition of the cream and non-fat dry milk reduces the temperature to between about 110° F. to about 130° F. The mixture is reheated to a temperature of from about 165° F. to about 175° F. over a period of from about 2 to about 3 hours. The mixture is then cooled to a temperature of from about 85° to about 95° F. A lactic acid producing cheese culture, at least one enzyme and rennet are then added to the mixture. The lactic acid cheese culture is preferably *Streptococcus lactis*. The mixture is agitated gently as the various components are added to the mixture. The mixture is then fermented until the pH is between about 4.8 and about 5.2. The fermentation takes place quiescently over a period of time of from about 15 hours to abut 25 hours.

At this time, a thick, viscous coagulum having the consistency of heavy cream cheese has formed. Some whey may form through syneresis on top of the coagulum and some of this whey may be manually removed by ladling.

The enzyme is preferably a lipase or mixture of lipases. The preferred source of lipase is that obtained by extraction from the throat tissue of calves, lambs or kids. These lipases are commercially available under the tradenames Italase C and Capalase KL and their manufacture is generally disclosed in U.S. Pat. Nos. 2,531,329 and 2,794,743.

Other forms of lipolytic enzymes, such as microbial lipases and pancreatic lipases, may be substituted for all or part of the throat tissue lipase. An example of a commercially available microbial lipase is that obtained from *Candida cylindracea*, Type VIII. An example of a commercially available pancreatic lipase is that sold as porcine pancreatic lipase. One unit of the *C. cylindracea* microbial lipases will hydrolyze 1.0 microequivalent of fatty acid from a triglyceride in one hour at pH 7.4 at 37° C. One unit of the porcine pancreatic lipase will release 1.0 micromole of acid per minute at pH 8.0 at 25° C. from an olive oil substrate.

The lipase is preferably a mixture of kid lipase and lamb lipase. The lipases are usually provided in a powder form and are added to the mixture at a level of from about 0.1% to about 1.0%.

The coagulum is then agitated by the apparatus shown in FIG. 1. The apparatus includes a fermentation tank 11, augers 13 and 15 and surface scraping blades 17 and 19. The augers are driven by motors 21 and 23 and the surface scraping blades are driven by motor 25. The fermentation tank has a jacket 27 for use in heating and cooling the mixture during the process. A pump 29 is used to transfer the product after the process has been finished. The use of both augers and surface scraping blades is required because of the high viscosity coagulum that is formed during the fermentation step.

At the start of agitation, the coagulum has the consistency of heavy cream cheese. Heating is commenced at the start of agitation and the coagulum is heated from a temperature of from about 85° to about 95° F. to a temperature of from about 165° to about 175° F. over a period of from about 3 to about 5 hours. Salt and a phosphate are added to the cheese product during the end of the heating step. After the heating step has been completed, the coagulum has been converted to a highly flavored cheese product. The cheese product is held at the elevated temperature for one minute and is then cooled from the elevated temperature to a temperature of from about 40° to about 50° F. over a period of from about 8 to about 11 hours.

The total time required to produce the highly flavored cheese product is from about 40 to about 55 hours.

The following example further illustrates various features of the invention but is intended to in no way limit the scope of the invention as set forth in the appended claims.

EXAMPLE 1

4920 pounds of water and 360 pounds of whole milk powder were added to the fermentation tank of FIG. 1. The water was heated to a temperature of 170° F. with milk agitation and 3600 pounds of plastic cream having a fat content of 80% were added to the tank. The mixture was circulated through an homogenizing system during mixing. 2890 pounds of non-fat dry milk were added to the tank as the mixture continued to be recirculated through the homogenizing system.

The mixture was then heated to a temperature of 170° F. over a period of 2.4 hours as the mixture was recirculated through a Dispax™ reactor.

The mixture is then cooled to a temperature of 90° F. An *S. lactis* culture was then added at a level of 84 pounds. The mixture was agitated gently by means of the scraper blades. A mixture of a kid and lamb lipase was then added at a level of 60 pounds. Rennet was added at a level of 1.2 pounds.

The mixture was allowed to ferment quiescently for 22 hours at a temperature of 90° F. At this time, the pH was 5.1. A small amount of whey had syneresed onto the surface of the coagulum, and some of the whey was removed with a ladle. The coagulum had the consistency of heavy cream. The fermentation took place quiescently with no agitation.

The two augers and the scraped surface blades were then activated while the mixture was heated to a temperature of 170° F. over a period of 4 hours. 84 pounds of salt and 245 pounds of phosphate were added to the cheese product during the heating period. The highly flavored cheese product was held at 170° F. for one minute and was then cooled from 170° to 45° F. over a period of 9.5 hours.

EXAMPLE 2

12,245 pounds of the highly flavored cheese product produced in accordance with the above process were pumped to a cooker. 300 pounds of body cheese which had been cured for a period of 30 days were added to the cooker. 430 pounds of filler cheese which had been aged for 3 months was added to the cooker. 200 pounds of semisoft cheese, 20 pounds of milk fat, 30 pounds of water and 20 pounds of sodium citrate were then added to the cooker. The mixture of cheeses was heated to a temperature of 165° F. in the cooker to provide a homogeneous process cheese mass which was packaged as single slices or loaves.

EXAMPLE 3

To produce a dehydrated cheese blend, 780 pounds of highly flavored cheese product of Example 1, 100 pounds of powdered whey, 100 pounds of water and 100 pounds of powdered sodium phosphate were added to the cooker prior to heating to 165° F. to provide a heated cheese mass. The cheese mass was homogenized and spray dried to provide a dehydrated flavored cheese blend.

What is claimed is:

1. A process for rapidly producing a highly flavored cheese product comprising the steps of:

providing a mixture of cream, whole milk and non-fat dry milk said mixture having a solids content of from about 45% to about 55%;

pasteurizing said mixture, adjusting the temperature of said mixture to between about 85° F. and about 95° F., adding a bacterial lactic acid producing culture, at least one enzyme selected from the group consisting of a lipase and a protease and rennet to said mixture;

fermenting said mixture at said temperature of from about 85° F. to about 95° F. for about 15 to about 25 hours to provide a highly flavored cheese coagulum;

heating said cheese coagulum to a temperature of from about 160° F. to about 175° F. to inactivate said culture and enzymes and to provide cheese curd;

cutting said cheese curd with agitation; and cooling said cheese curd to a temperature of from about 40° F. to about 50° F. to provide a highly flavored cheese product; where the process, from the time of pasteurizing said mixture to providing the highly flavored cheese product, can be completed within a total time of from about 35 to about 55 hours.

2. A method in accordance with claim 1 wherein said whole milk is selected from liquid whole milk adjusted to a solids content of from about 3% to about 6% and whole milk powder reconstituted with water to provide a reconstituted whole milk having a solids content of from about 3% to about 6%.

3. A method in accordance with claim 2 wherein said cream is present at a level of from about 25% to about 35% of said mixture, said whole milk is present at a level of from about 30% to about 50% of said mixture, and said non-fat dry milk is present at a level of from about 20% to about 30% of said mixture.

4. A method in accordance with claim 1 wherein said lactic acid producing culture is *Streptoccus lactis*.

5. A method in accordance with claim 1 wherein said enzyme is a mixture of kid lipase and lamb lipase.

6. A method in accordance with claim 1 wherein said enzyme is a powdered enzyme which is added to said mixture at a level of from about 0.01% to about 1.0% based on the weight of said mixture.

7. A method in accordance with claim 1 wherein said cutting of said curd is accomplished by use of the combination of at least one vertically disposed auger and a scraped surface agitation bar.

8. A method in accordance with claim 1 wherein the total time of fermentation is from about 15 hours to about 25 hours.

9. A method in accordance with claim 8 wherein said fermentation is continued until the pH is from about 4.8 to about 5.2.

* * * * *

UNITED STATES PATENT AND TRADEMARK OFFICE
CERTIFICATE OF CORRECTION

PATENT NO. : 5,952,022
DATED : September 14, 1999
INVENTOR(S) : Rufus M. Veal

It is certified that error appears in the above-identified patent and that said Letters Patent is hereby corrected as shown below:

Column 5, line 47, after "milk" insert a comma.

Signed and Sealed this

Twelfth Day of September, 2000

Attest:

Q. TODD DICKINSON

*Attesting Officer*       *Director of Patents and Trademarks*